Aug. 29, 1950     C. S. KRONE     2,520,730
ILLUMINATED VEHICLE ORNAMENT
Filed Sept. 30, 1949
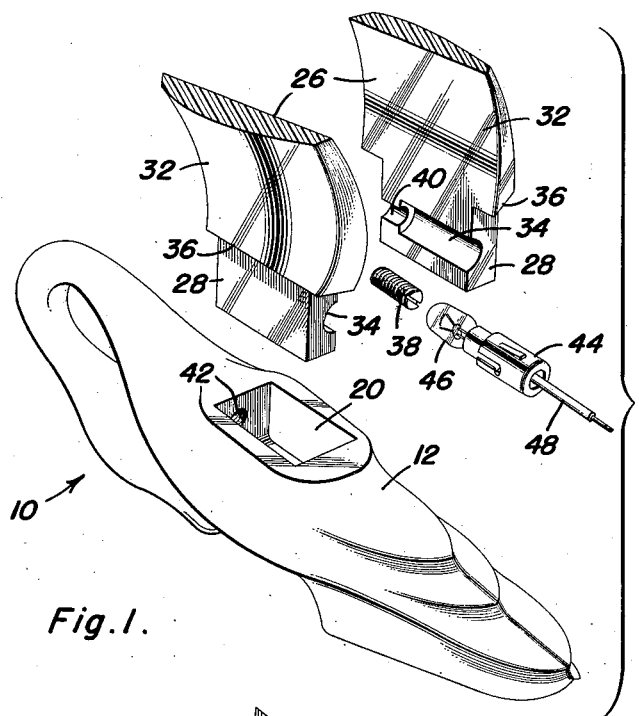
Fig.1.
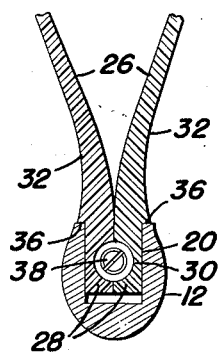
Fig.3.
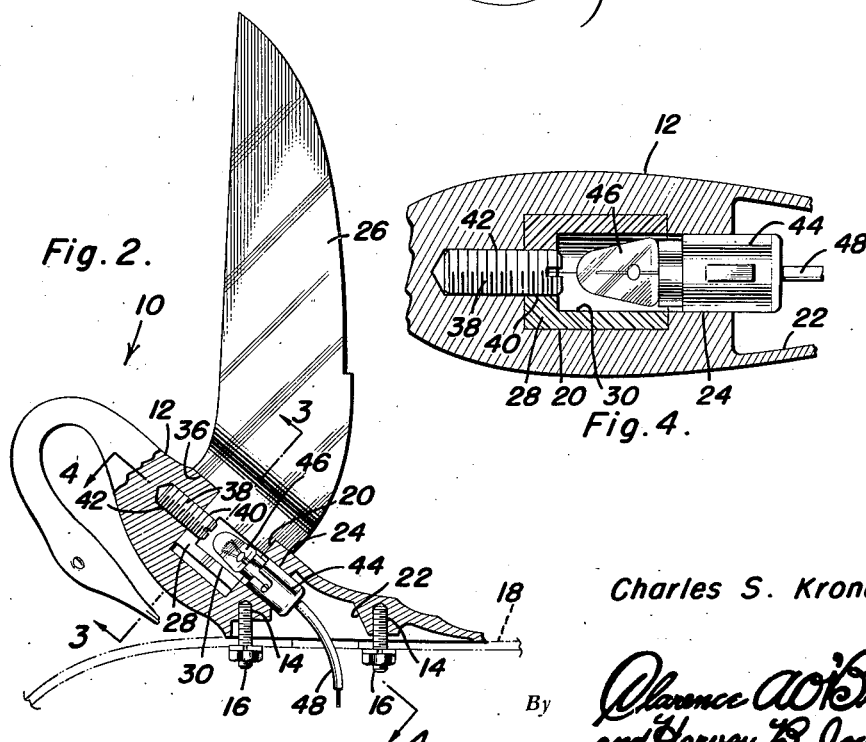
Fig.2.
Fig.4.
Inventor
Charles S. Krone
By *Clarence A. O'Brien and Harvey B. Jacobson*
Attorneys Patented Aug. 29, 1950

2,520,730

UNITED STATES PATENT OFFICE 2,520,730

ILLUMINATED VEHICLE ORNAMENT

Charles S. Krone, Chicago, Ill.

Application September 30, 1949, Serial No. 118,894

8 Claims. (Cl. 240—8.11)

This invention relates to new and useful improvements and structural refinements in illuminated ornaments for vehicles, more specifically, ornaments for hoods of automobiles, and the principal object of the invention is to provide a device of this character which is highly ornamental in appearance, simple in construction and convenient for servicing, such as for example, replacement of its component parts.

While the invention as disclosed herein is primarily intended for use as an ornament for automobile hoods, it is to be understood that the teachings of the invention may be extended to other allied uses, such as for example, desk ornaments, mantlepieces, Christmas tree ornaments, and other similar items of display.

With the above more important objects and features in view and such other objects and features as may become apparent as this specification proceeds, the invention consists essentially of the arrangement and construction of parts as illustrated in the accompanying drawings, in which:

Figure 1 is a group perspective view of the invention.

Figure 2 is a side elevational view thereof, this being partially broken away so as to reveal the assembly of components.

Figure 3 is a cross sectional view, taken substantially in the plane of the line 3—3 in Figure 2, and Figure 4 is a cross sectional view, taken substantially in the plane of the line 4—4 in Figure 2.

Like characters of reference are employed to designate like parts in the specification and throughout the several views.

Referring now to the accompanying drawings in detail, the invention consists of an illuminated ornament designated generally by the reference character 10, the same embodying in its construction a suitably configurated body 12 provided in its lower portion with a plurality of screw threaded apertures 14 to receive a plurality of studs 16 whereby the entire ornament may be suitably mounted on a support, such as for example, an automobile hood 18.

An upper portion of the body 12 is provided with an open recess 20 while the lower portion of the body is similarly recessed as at 22, a bore 24 being provided in the body and connecting the recesses 20, 22, as is best shown in Figure 2. The recess 22 is offset from the recess 20 so that they are arranged side by side on opposite faces of the body.

An upward extension 26 is provided on the body 12, this extension being formed from suitable translucent material and having a cross sectionally reduced lower portion 28 thereof being inserted into and seated in the recess 20, substantially as shown.

It is to be noted that the lower portion 28 of the insert or extension 26 is provided with a substantially cylindrical chamber 30, and it may be explained at this point that the extension 26 may be formed integrally from one piece of material by molding, casting, or the like, or alternatively, the extension may be made in the form of a pair of complementary members or sections, as exemplified at 32 in Figures 1 and 3. The later construction is preferable in instances where the sections 32 are to be formed from sheet material, or the like, and if this form of construction is used, the lower end portions of the sections 32 are provided with complemental opposing grooves 34 (see Figure 1) defining the chamber 30 when the two sections are disposed side by side in the recess 20, as shown.

In any event, the diametrically reduced lower portion 28 of the extension 26 affords inwardly stepped shoulders 36 on the extension, which shoulders abut the upper surface of the body 12 and prevent the extension from being inserted too far into the recess 20.

It is to be noted that the extension 26 is secured to the body 12 by a suitable screw 38 which extends through a suitable aperture 40 in the inner end wall of the chamber 30 into a screw threaded aperture 42 provided in the body.

The bore or aperture 42, the aperture 40, and the chamber 30 are coaxial with the bore 24, so that a screw driver may be inserted through the bore 24 and through the chamber 30 to tighten or loosen the screw 38, as will be clearly apparent.

The bore 24 is intended to accommodate by frictional engagement a lamp socket 44 in which is mounted a suitable incandescent lamp 46, this lamp being disposed within the chamber 30 so that light rays emanating from the lamp are dispersed through or conducted by the translucent material of the extension 26, thus producing a highly realistic effect.

Needless to say, the socket 44 and the lamp 46 therein are grounded through the medium of the body 12 to the vehicle on which the ornament is mounted, and a conductor 48 extends through the recess 22 into the socket 44 for deliverying a supply of electric current to the lamp.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. An illuminated vehicle ornament comprising a body adapted for mounting upon a vehicle and having an upper portion provided with a recess and a lower portion thereof provided with an oppositely facing recess, and a wall in said body between said recesses, said wall having a bore therein communicating with said recesses, an upward extension provided on said body and having its lower end portion seated in said recess of said upper portion, said extension being formed from translucent material and being provided at its lower end portion with a chamber coinciding with said bore, an end wall of said chamber opposite said bore being provided with an aperture, a fastening means positioned in said aperture and extending into said body for securing said extension to the latter, a lamp socket removably positioned in said bore, and a lamp mounted in said socket and disposed in said chamber.

2. An illuminatable ornament comprising an upper extension and a lower body, said body having upwardly and downwardly facing open recesses, respectively, on opposite faces thereof, coaxial bores in said body at opposite ends of said upper recess, the lower portion of said extension projecting into said upper recess and being seated therein, said lower portion of said extension having a chamber therein to receive an illuminating means, said lower extension portion being secured to said body by fastening means extending through said lower portion and into one of said bores, and illuminating means extending through said downwardly facing recess, through the other of said bores and into said chamber to illuminate said extension, said extension being made of light pervious material.

3. An illuminatable ornament comprising a body and an upper extension for said body, said body having an upwardly facing open recess on one face, and a downwardly facing open recess on the opposite face, said downwardly facing recess being laterally offset from said upper recess, coaxial bores extending in said body at opposite ends of said upper recess, the lower portion of said extension being seated in said upper recess, said lower portion having a chamber therein communicating with said bores and being substantially coaxial therewith, fastening means extending through a wall of said chamber and into the adjacent bore for securing the lower portion of said extension to the body, and illuminating means extending through said downwardly facing recess, through the other of said bores, and into said chamber to illuminate the upper portion of said extension, said extension being made of light pervious material.

4. An illuminatable ornament comprising a body, an upper extension for said body, said body havng upwardly and downwardly facing open recesses, respectively, on opposite faces thereof, bores in said body communicating with said upper recess at opposite ends thereof, said upper extension being seated in said upper recess, said upper extension having an enlarged chamber in the seated portion communicating with said bores, said chamber having an end wall with an aperture coinciding with one of said bores, said bores and chamber being substantially coaxial, fastening means concealed within said body and extension and passing through the aperture of said end wall and into the adjacent bore for securing said extension to said body, and illuminating means extending through the downwardly facing recess, through the other bore, and into said chamber to illuminate said extension, said extension being made of light pervious material.

5. An illuminatable ornament comprising an upper extension and a lower body, said body having upwardly and downwardly facing open recesses, respectively, on opposite faces thereof, a wall in said body between said recesses, bores in said body at opposite ends of said upper recess, one of said bores extending through said wall and establishing communication between said recesses; the lower portion of said extension projecting into said upper recess and being seated therein, said lower portion of said extension having a chamber therein to receive an illuminating means, said lower portion of said extension being secured to said body by concealed fastening means extending through said lower portion and into the bore adjacent said fastening means, and illuminating means extending through said downwardly facing recess, through the bore in the wall connecting said recesses and into said chamber to illuminate said extension, said extension being made of light pervious material; said recesses, bores and chamber having a substantially common axis to permit access to said concealed fastening means.

6. An illuminatable ornament comprising a body having oppositely facing recesses disposed in side by side relation with a wall therebetween, said wall having a bore therein to establish communication between said recesses, an insert in one of said recesses of light pervious material, said insert having a chamber therein communicating with said bore, illuminating means extending through the other of said recesses and projecting into said chamber to illuminate said insert, said illuminating means being supported in said bore, and a second bore in said body opposite to and substantially coaxial with said first bore, and fastening means passing through a wall of said insert into said second bore to secure said body and insert together.

7. An ornament according to claim 6, wherein said insert comprises complemental sections having juxtaposed lower end portions, each provided with a substantially coinciding groove defining said chamber.

8. An illuminatable ornament comprising an upper extension and a lower body, said body having upwardly and downwardly facing open recesses, respectively, on opposite faces thereof and disposed side by side with a wall therebetween, said wall being provided with a bore, the lower portion of said extension projecting into said upper recess and being seated therein, said lower portion of said extension having a chamber therein to receive an illuminating means, the chamber being aligned with said bore, the illuminating means extending through said downwardly facing recess and through said bore into said chamber to illuminate said extension, said extension being made of light pervious material and a second bore in said body opposite to and substantially coaxial with said first bore, and fastening means passing through a wall of said extension and into said second bore to secure said body and extension together.

CHARLES S. KRONE.

REFERENCES CITED

The following references are of record in the file of this patent:

UNITED STATES PATENTS

| Number | Name | Date |
|---|---|---|
| D. 61,926 | Carlisle | Feb. 13, 1923 |
| 1,337,222 | Harned | Apr. 20, 1920 |
| 1,876,625 | Daugherty | Sept. 13, 1932 |
| 1,949,551 | Somervell | Mar. 6, 1934 |
| 1,959,616 | Derrah | May 22, 1934 |
| 2,308,844 | Wilshusen | Jan. 19, 1943 |
| 2,316,589 | Iwanowicz | Apr. 13, 1943 |
| 2,329,882 | Clark | Sept. 21, 1943 |
| 2,426,713 | Simpson | Sept. 2, 1947 |
| 2,428,975 | Lamb | Oct. 14, 1947 |
| 2,479,666 | Bowman | Aug. 23, 1949 |